2,702,794
Patented Feb. 22, 1955

2,702,794
SEPARATION OF EMULSIONS

George W. Kellogg, Flint, Mich., assignor to General Motors Corporation, Detroit, Mich., a corporation of Delaware No Drawing. Application March 1, 1951,
Serial No. 213,473

16 Claims. (Cl. 252—329)

This invention relates to the separation of emulsions and particularly to a process for separating oil from its water emulsion.

Many of the emulsions commercially requiring resolution are of the "water-in-oil" type in which the water is emulsified in the oil. Methods of treating this type of emulsion to break down and separate its constituents are well-known and widely used industrially. Reagents such as sulphonates, soaps, resins, fixed oils and various mixtures and combinations of such materials have frequently been used. Electrical precipitation has also been widely resorted to.

However, where oil is emulsified in water wherein the water is in the continuous phase and the oil is the disperse phase, these emulsions are capable of indefinite dilution with water without breaking. In contrast with the water-in-oil type of emulsion, these "oil-in-water" emulsions do not readily separate from the water, and the demulsifying agents normally used to resolve water-in-oil emulsions are ineffective for treating the oil-in-water emulsions.

Modern industry extensively uses emulsions of oil in water for cutting, grinding and cooling operations, these emulsions being customarily made up at the place where they are to be used by mixing water with an emulsifiable oil product purchased for that purpose. These commercial emulsifiable oils possess various chemical compositions but are all commonly classified and generally referred to as "soluble oils." During operation these oil-in-water emulsions become contaminated with dirt, steel particles, grinding wheel materials, etc., often resulting in undesirable chemical breakdowns. Furthermore, water evaporation and the necessary frequent addition of one or the other of the two constituents also cause variations in the ratio of oil to water.

As a consequence of these contaminations and chemical breakdowns, the old emulsions are periodically discarded and replaced with fresh emulsions. The practice of allowing these "soluble oil" emulsions to drain into sewers has created a water pollution problem of major importance. Consequently there has been an increasing demand by various governmental authorities to restrict the oil remaining in water as it enters a river or other public body of water to an amount as low as only 15 parts of oil per million parts of water. Moreover, the purification processes heretofore employed often necessitated the expensive operations of filtering, handling and disposing of a sludge which was formed.

Accordingly, a principal object of this invention is to provide a method of treating emulsions of oil in water to obtain a degree of separation of such emulsions to an extent necessary to comply with any such stringent governmental requirements. A further object of the invention is to provide an emulsion separation process which creates no objectionable sludge, thereby permitting the use of relatively simple and inexpensive equipment and reducing labor costs. Moreover, it is yet another object of the invention to separate such oil in water emulsions by a method in which costs are still further reduced by permitting the recovery of the oil for re-use or reprocessing.

These and other objects are attained in accordance with the present invention by providing a process wherein an emulsion is first treated with an emulsion breaking or separating agent and then with a normally non-emulsifying light oil as a solvent for the oil originally present in the emulsion. In order to obtain the most satisfactory separation results, I have found it advantageous to gently agitate the mixture after treatment with the emulsion breaking agent, to violently agitate it after the light oil addition, and to subsequently allow the oil and water components to separate by gravity.

More specifically, I have found it desirable before adding the emulsion-breaking agent to remove from the surface of the emulsion by known means any free mineral or other oils which may be present. This operation provides an emulsifiable oil which is substantially unadulterated by lubricating or cutting oils for use with the oil removed by a subsequent step in the process, whereby the oil recovered may be salvaged for reprocessing.

The separating or emulsion-breaking agent is then added, a demulsifying salt having been found to be the most suitable reagent for this purpose. In general, I have found that an appreciable amount of separation can be obtained with certain salts of a strong base and a strong acid, such as sodium chloride and calcium chloride. Although these salts produce oil separation, the addition of sodium chloride and calcium chloride in amounts equal, respectively, to at least 5.0% and 0.5% by weight of the emulsion proved to be necessary to provide this separation to a really satisfactory degree. Moreover, I have found that the use of aluminum sulphate as an emulsion-breaking agent in accordance with my invention has a marked advantage in this oil emulsion separation process.

Accordingly, when aluminum sulphate was substituted for the aforementioned chlorides, I obtained satisfactory separation with the addition of this compound in amounts ranging from 0.25% to 2.0% of the weight of the emulsion. Additions of aluminum sulphate in quantities larger than 2.0% appeared to produce no appreciable increase in the amount of separation. More particularly, the best separation was obtained through the use of at least 0.5% by weight of commercial grade aluminum sulphate, preferably in the form of the hydrated salt $Al_2SO_4.18H_2O$.

Moreover, I found that even when considerably lesser amounts of aluminum sulphate were used as compared with the necessary quantities of sodium chloride and calcium chloride, the degree of separation obtained by the use of aluminum sulphate was superior than that produced by the use of the former salts. This result is in accordance with my discovery that a trivalent salt, such as aluminum sulphate, is superior as a separating agent than a salt of lower valence. These separating salts may all be added in the form of water solutions.

Following the salt addition the emulsion is preferably violently agitated for a short period of time. I have found that at least a five-minute agitation period is desirable and, although a longer agitation period may be advantageous, more than 15 minutes of agitation appears to produce no further beneficial results. This agitation should be as violent as is feasible with normal commercial apparatus, the purpose being to bring the salt into intimate contact with minute particles of the emulsified materials. After this period of rapid agitation, a short separating period should be allowed, a period of quiescence of at least a one-half hour being desirable.

At this stage in the process, in order to avoid overloading the subsequently added solvent with a disproportionate amount of oil, the oil now floating on the surface of the mixture due to gravity action is then preferably removed. This oil may be saved for later mixing with water containing a small amount of a water soluble alkaline salt, such as sodium carbonate, this mixture then being stirred into an emulsion for re-use as a "soluble oil." Alternatively, this recovered oil may be salvaged and disposed of to commercial concerns for reprocessing. The incorporation of this step into the process has been found to still further reduce the operating costs of the process by lowering solvent expense as well as gaining the benefit from the recovery step.

After the surface removal of the aforementioned emulsified oil, the normally non-emulsifiable light oil is added as a solvent for the relatively small amount of the original oil still present in the effluent. I have found that, in order to obtain separation to a high degree, this light oil should be added in amounts equal to at least approximately 15% of the volume of the mixture before treatment. The addition of 15% to 25% by volume of such an oil is normally desirable to produce satisfactory results for various purposes. Larger quantities may be used but, inasmuch as additions of more than 25% unnecessarily increase the expense of the process, amounts of 15% to 25% by volume are recommended for most applications.

After testing various oils and solvents as additives for the removal of oil traces in the effluent, including heavy and light mineral oils, coal tar solvents, etc., I discovered that the lower the viscosity of the oil used the better the separation. Among the normally non-emulsifying oils which possess the proper solvent properties, xylene, benzene, mineral seal oil and other mineral oils of similar weight have proved particularly satisfactory. However, inasmuch as such additives should be insoluble in water to a large extent, xylene, being one-hundred per cent insoluble, is especially suitable for this purpose. In this process high solvent power of the oil additive is desirable to permit the dissolving of oxidized oils but, at the same time, the use of solvents having high flash and fire points is preferred in order to reduce the fire hazard. Therefore, xylene, which meets all these requirements, is particularly adapted for use in this process and produces highly satisfactory results when added in an amount equal to only 15% by volume of the untreated emulsion. Many of the other light mineral oils, however, are less expensive than xylene and are satisfactory for use in some instances.

After this light oil addition, a second and shorter period of violent agitation is preferably employed, agitation from two to five minutes producing satisfactory results. This agitation breaks down the light oil additive into small particles and brings them into intimate contact with the rest of the mixture. The period of vigorous agitation is preferably followed by gentle agitation for at least ten minutes. It is desirable that this gentle agitation be at such a rate as to provide sufficient time for the light oil to intimately contact the water portion of the solution. If this mild agitation is omitted the light oil rises to the surface too rapidly, resulting in incomplete separations. If feasible, adequate time should be allowed for the light oil to almost completely absorb the very fine oil particles dispersed in the water phase in order to obtain a high quality effluent in a practical commercial manner.

Following this period of mild agitation, time should be allowed to permit separation by gravity. I have found it desirable to allow at least six hours for this separation process. The top layer of oil is then removed and preferably saved for re-use, this same oil being usable over and over again for this purpose. The effluent is then discarded or, if necessary, diluted further before being discarded.

This entire process, as described above, is designed to accommodate at least one complete batch of used "soluble oil" every twenty-four hours.

There may be instances where it is advantageous to subject the emulsion to some conditioning equipment before employing the above-described process. For example, emulsions containing alkaline salts, such as sodium carbonate, or alkaline cleaning solutions having soluble oils are benefited by a neutralizing operation before processing.

It should be noted that this process requires no heating operations, thus further contributing to the low cost of equipment and maintenance. In fact, contrary to what would normally be expected in view of analogous commercial processes employing heat, my tests have shown that the colder the solution the better the process results. Normal room temperatures are quite satisfactory in all instances.

By using the process outlined above I have been able to reduce the oil content of an "oil-in-water" emulsion containing 15% to 25% by volume of the oil originally present to a point where there is less than 15 parts of the oil per million parts of water. As hereinbefore indicated, this substantial reduction in oil content produces an effluent which meets the most stringent governmental requirements for preventing stream pollution. At the same time the separation of the oil and water is accomplished in a very inexpensive manner wherein initial investment and maintenance costs are reduced to a minimum and where there is no great waste of water to dilute the emulsion.

It is to be understood that while the invention has been described in conjunction with certain specific examples, the scope of the invention is not to be limited thereby except as defined in the appended claims.

I claim:
1. A process for resolving an oil-in-water emulsion comprising treating such emulsion with a water-soluble inorganic salt, agitating the mixture, adding thereto a normally non-emulsifiable light oil, subjecting the mixture to a second period of agitation, and subsequently permitting gravity separation until the oil is substantially separated from the water.

2. The process of resolving an oil-in-water emulsion which comprises treating such emulsion with a water-soluble inorganic salt, subjecting said mixture to a short period of violent agitation followed by a short gravity separation period, removing the formed oil layer from the surface of the mixture, treating the residue with a solution of a normally non-emulsifiable light oil, violently agitating the mixture, and finally subjecting the mixture to a short period of gentle agitation and to a period of gravity separation of several hours.

3. A process for breaking an oil-in-water emulsion comprising treating such an emulsion with a demulsifying salt of the class consisting of aluminum sulphate, sodium chloride and calcium chloride, adding to the mixture a low-viscosity normally non-emulsifiable oil as a solvent in an amount equal to at least approximately 15% of the volume of the emulsion, agitating the mixture for a brief period of time, and subsequently permitting separation by gravity.

4. A process for resolving an oil-in-water emulsion comprising treating such emulsion with a demulsifying salt of the class consisting of aluminum sulphate, sodium chloride and calcium chloride, removing the formed oil layer from the surface of the mixture, adding to the mixture at least approximately 15.0% by volume of xylene, agitating the mixture for a brief period of time, and thereafter permitting separation by gravity.

5. A process for treating an oil-in-water emulsion comprising introducing to the liquid a separating agent of the class consisting of aluminum sulphate, sodium chloride and calcium chloride, violently agitating the emulsion for a period of time long enough to effect repeated contact of the separating agent with the emulsion, subsequently maintaining the emulsion in a quiescent state for a period sufficient to allow an oil layer to be formed on the surface of the emulsion, removing the separated oil from the emulsion surface, adding to the residue a normally non-emulsifiable light oil in an amount equal to at least 15 per cent by volume, subjecting the emulsion to periods of first violent and then gentle agitation, subsequently maintaining the mixture in a quiescent state for a period sufficient to permit separation by gravity, and thereafter removing the stratified oil from the surface of the aqueous residue.

6. The process for resolving an oil-in-water emulsion comprising treating such emulsion with a demulsifying salt of the class consisting of aluminum sulphate, sodium chloride and calcium chloride, violently agitating the mixture for at least five minutes, removing the formed oil layer from the surface of the mixture, adding to the mixture a low-viscosity normally non-emulsifiable oil as a solvent, in an amount equal to approximately 15% to 25% by volume of the emulsion, again violently agitating the mixture for at least a two minute period, subsequently subjecting the mixture to gentle agitation for at least ten minutes, and subsequently permitting separation by gravity.

7. A process for treating an oil-in-water emulsion comprising adding thereto an emulsion breaking salt of the class consisting of aluminum sulphate, sodium chloride and calcium chloride, treating the mixture with a normally non-emulsifiable oil of the class consisting of xylene, benzene and mineral seal oil, said oil being added in an amount equal to at least approximately 15% of the volume of the mixture, and subsequently permitting the oil and water to separate by gravity.

8. A process for resolving an oil-in-water emulsion comprising adding thereto an emulsion breaking salt of the class consisting of aluminum sulphate, sodium chloride and calcium chloride in an amount equal to at least 0.25% of the total weight of the mixture, agitating the mixture for a brief period of time, treating the mixture with a normally non-emulsifiable oil of the class consisting of xylene, benzene and mineral seal oil, said oil being added in an amount equal to 15% to 25% of the volume of the mixture, violently agitating the mixture for a brief period of time, subsequently subjecting the mixture to a short period of gentle agitation, and finally permitting separation by gravity.

9. A process for resolving an oil-in-water emulsion comprising adding thereto an emulsion breaking salt of the class consisting of aluminum sulphate, sodium chloride and calcium chloride in an amount equal to at least 0.25% of the total weight of the mixture, agitating the mixture for at least ten minutes, removing the formed oil layer from the surface of the mixture, treating the mixture with xylene in an amount equal to 15% to 25% of the volume of the emulsion, violently agitating the mixture for a period of at least two minutes, subsequently subjecting the mixture to gentle agitation for at least ten minutes, and finally permitting the oil to separate from the aqueous residue by gravity.

10. The process of breaking an oil-in-water emulsion comprising thoroughly admixing the emulsion with at least 0.25% by weight of aluminum sulphate, adding to the mixture at least 15% by volume of a normally non-emulsifiable oil of the class consisting of xylene, benzene and mineral seal oil, allowing the admixture to stratify, and thereafter removing the formed oil layer from the aqueous residue.

11. The process for resolving an oil-in-water emulsion comprising thoroughly admixing the emulsion with at least 0.25% by weight of aluminum sulphate, allowing the admixture to stand and stratify, withdrawing the formed oil layer, adding to the mixture at least 15% by volume of xylene, subjecting the admixture to subsequent short periods of violent and gentle agitation, again allowing the admixture to stratify, and thereafter removing the formed oil layer from top of the aqueous residue.

12. A process for resolving an oil-in-water emulsion comprising adding to the emulsion an amount of aluminum sulphate equal to 0.25% to 2.0% of the total weight of the mixture, subjecting the mixture to a short period of violent agitation followed by a short separation period, removing the formed upper layer of stratified oil, adding to the residue at least 15% by volume of a normally non-emulsifiable oil of the class consisting of xylene, benzene and mineral seal oil, subjecting the mixture to a second period of agitation, allowing separation by gravity to proceed until the remainder of the oil is substantially separated by water, and subsequently removing the layer of oil formed on the surface of the aqueous residue.

13. A process for resolving an oil-in-water emulsion comprising adding to the emulsion an amount of aluminum sulphate equal to 0.25% to 2.0% of the total weight of the mixture, subjecting the mixture to a short period of violent agitation followed by a short separation period, removing the formed upper layer of stratified oil, treating the residue with xylene in an amount equal to at least 15% of the volume of the emulsion, subjecting the mixture to a second period of violent agitation followed by a short period of gentle agitation, allowing separation by gravity to proceed until the remainder of the oil is substantially separated from the water, and thereafter removing the stratified oil from the surface of the aqueous residue.

14. A process for resolving an oil-in-water emulsion comprising adding to the emulsion an amount of aluminum sulphate equal to 0.25% to 2.0% of the total weight of the mixture, subjecting the mixture to a five to fifteen minute period of violent agitation followed by a separation period of at least one-half hour, removing the formed upper layer of stratified oil, treating the residue with xylene in an amount equal to 15% to 25% of the volume of the emulsion, subjecting the mixture to a two to five minute period of violent agitation followed by at least ten minutes of gentle agitation, allowing separation by gravity to proceed for at least six hours, and subsequently removing the layer of oil formed on the surface of the aqueous residue.

15. A process for resolving an oil-in-water emulsion comprising adding to the emulsion at least 0.5% by weight of aluminum sulphate, subjecting the mixture to a short period of agitation followed by a short separation period, removing the separated oil from the surface, adding to the residue 15% by volume of xylene, subjecting the mixture to a second period of agitation followed by gravity separation until the remainder of the oil is substantially separated from the water.

16. A process for resolving an oil-in-water emulsion comprising removing free oils from the surface of the emulsion, adding to the emulsion 0.5% by weight of aluminum sulphate, subjecting the mixture to violent agitation for five to fifteen minutes followed by a quiescent separation period of at least one-half hour, removing the separated oil from the surface, adding xylene to the residue in a volume equal to 15% of the emulsion, subjecting the mixture to a two to five minute period of violent agitation followed by gentle agitation for at least ten minutes, allowing separation by gravity to proceed for at least six hours, and removing the formed top layer of oil from the surface of the aqueous residue.

References Cited in the file of this patent

UNITED STATES PATENTS

| Number | Name | Date |
|---|---|---|
| 2,133,186 | Campbell | Oct. 11, 1938 |
| 2,159,312 | Blair | May 23, 1939 |
| 2,318,714 | Robertson | May 11, 1943 |
| 2,504,019 | Hall | Apr. 11, 1950 |
| 2,568,745 | Kirkpatrick | Sept. 25, 1951 |
| 2,589,201 | Monson | Mar. 11, 1952 |

OTHER REFERENCES

API Manual on Disposal of Refinery Wastes, 1st ed., 1930, pub. by American Petroleum Institute, N. Y., N. Y.